June 21, 1966 P. SUDARSKY 3,256,643
MACHINE FOR LAPPING BEARING ELEMENTS OR THE LIKE
Filed Oct. 10, 1963 3 Sheets-Sheet 1
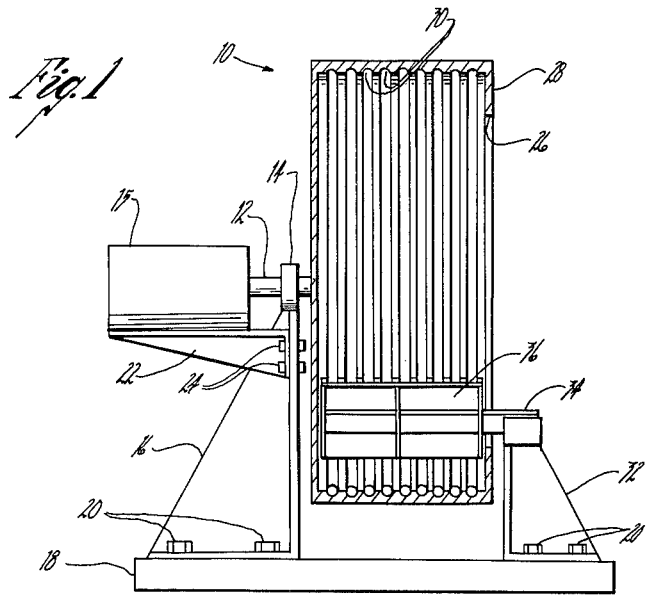
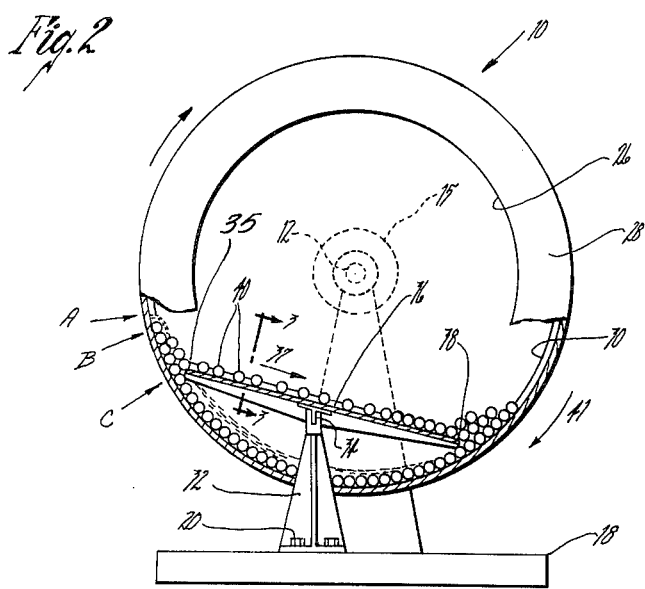
INVENTOR.
PETER SUDARSKY
BY
McCormick, Paulding & Huber
ATTORNEYS June 21, 1966 P. SUDARSKY 3,256,643
MACHINE FOR LAPPING BEARING ELEMENTS OR THE LIKE
Filed Oct. 10, 1963 3 Sheets-Sheet 2
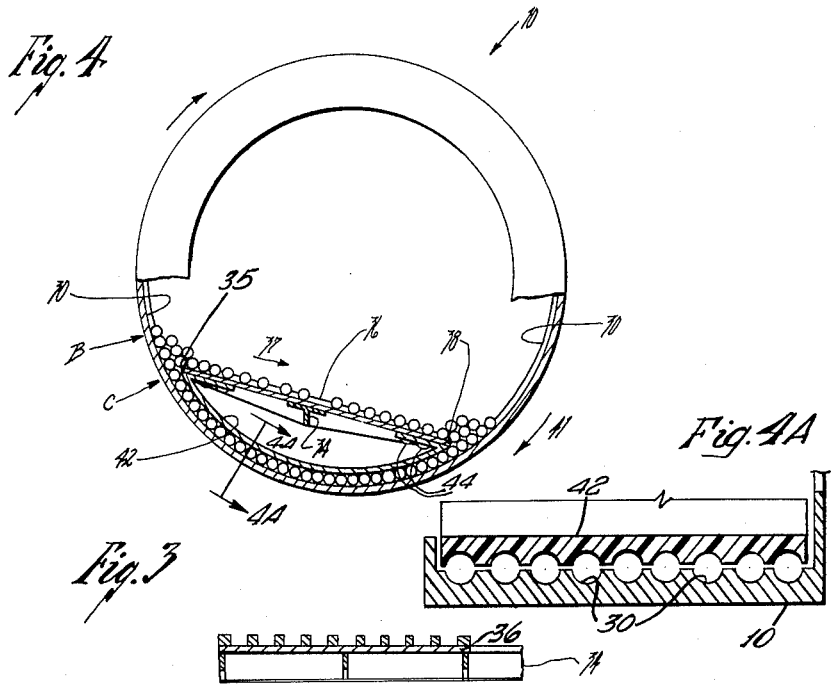
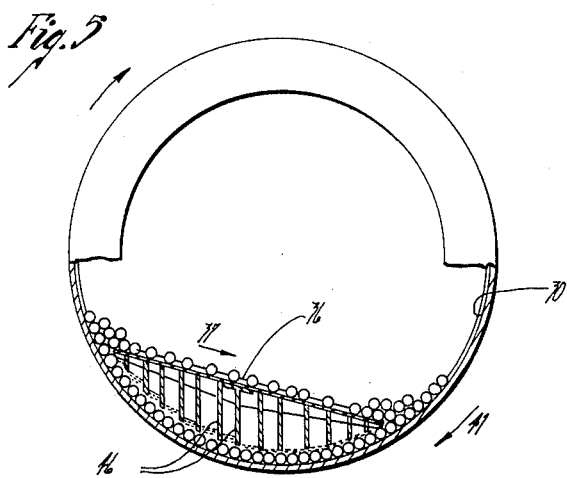

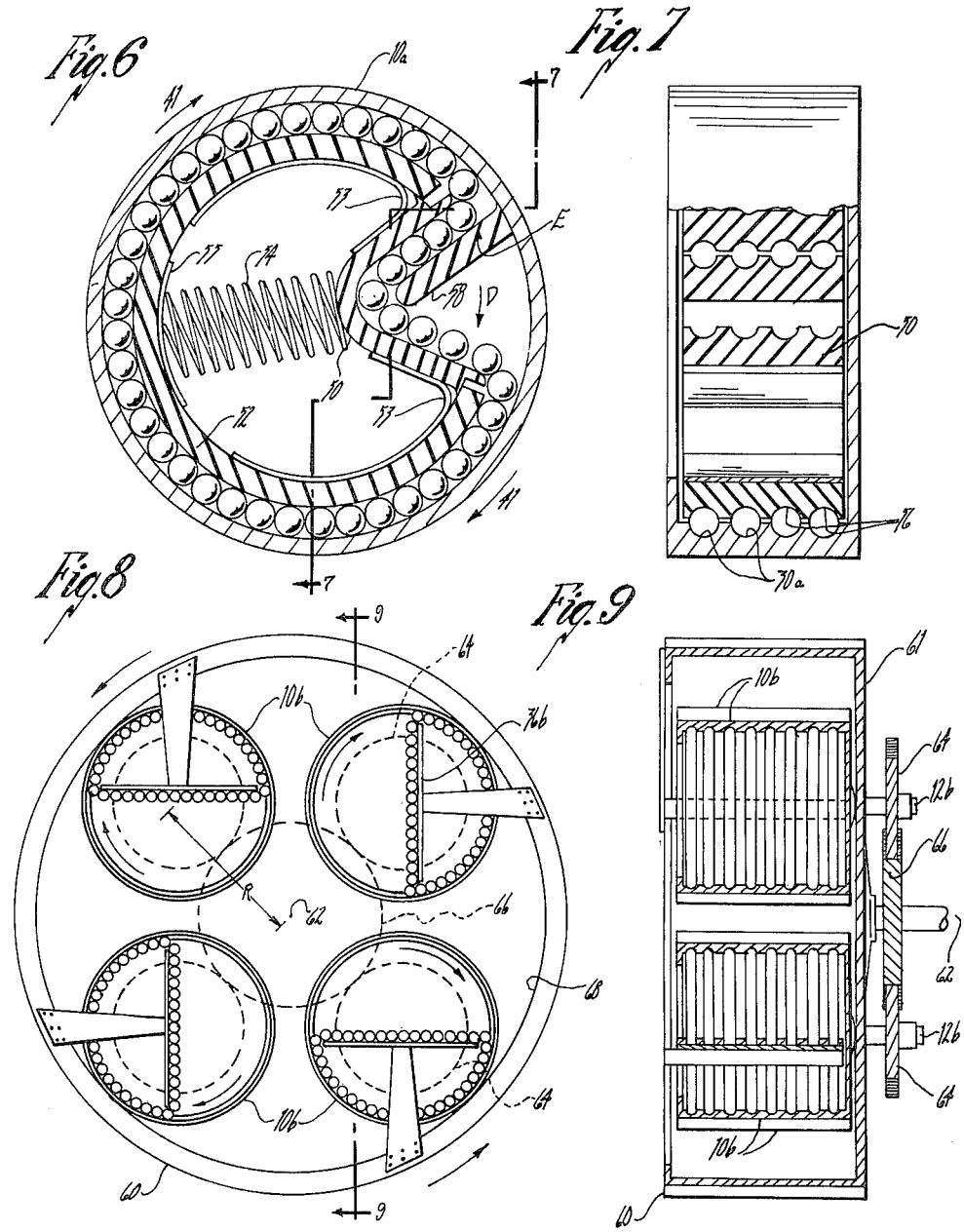

United States Patent Office 3,256,643
Patented June 21, 1966

3,256,643
MACHINE FOR LAPPING BEARING ELEMENTS
OR THE LIKE
Peter Sudarsky, 71 Wood Pond Road, Farmington, Conn.
Filed Oct. 10, 1963, Ser. No. 315,323
7 Claims. (Cl. 51—164)

This invention relates generally to a machine for lapping bearing elements such as steel needles or balls and for applying a highly polished or ground, close tolerance finish to needles or balls of the type normally used in bearings or the like.

The general object of the present invention is to provide a novel machine for grinding or otherwise processing these bearing elements to produce the desired finish. In keeping with this general object, it is a feature of the invention to provide a machine utilizing a plurality of grooves to carry the elements through a lapping fluid or other grinding media, each element being ground in an even manner by the motion of the elements relative to the grooves and to the lapping fluid or the like. Although the elements shown in the drawings are steel balls of the type normally found in ball bearings the present invention is not so limited being equally applicable to the lapping of other symmetrical elements of revolution such as cylinders or the like.

The drawings show several embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a side elevational view partly in section of one embodiment of the present invention;

FIG. 2 is a front view of the FIG. 1 machine;

FIG. 3 is a sectional view of the tray of the FIG. 1 machine taken along the line 3—3 of FIG. 2;

FIG. 4 is a front view of the lower portion of the barrel of the FIG. 1 machine but with an alternative tray structure embodying a retaining belt;

FIG. 4A is a sectional view of retainer shown in FIG. 4 taken along line 4A—4A of that figure.

FIG. 5 is a front view of the lower portion of the barrel of the FIG. 1 machine but with an alternative structure embodying a series of baffles;

FIG. 6 is a front elevational view of an alternative embodiment of the present invention;

FIG. 7 is a vertical sectional view taken as indicated by line 7—7 of FIG. 6;

FIG. 8 is a front elevational view of still another embodiment of the invention; and FIG. 9 is a vertical sectional view taken as indicated by line 9—9 of FIG. 8.

As mentioned hereinabove, a machine provided in accordance with this invention is particularly adapted to lap steel balls. Various types of machines have heretofore been offered to the trade for lapping steels balls, for example, machines have been provided which feed the balls to be lapped between two opposing circular grooved plates. A stationary or gap plate, has a gap through which the balls are fed onto a rotating wringer plate which is also grooved. The balls pass around the aligned grooves between these plates somewhat less than one full revolution of the gap plate and are subsequently picked off the wringer plate by a scoop. Preparation of these plates must be meticulous if the size tolerance of the balls is to be controlled since centrifugal force tends to wear these grooves unevenly. Furthermore, since the outer grooves and the balls therein move faster than the inner grooves, the lapping process varies transversely across these grooves.

In accordance with the present invention a machine is provided in which the lapping does not vary across the grooves. Therefore, it will be shown that the present invention provides an improved machine for lapping steel balls as well as several machine embodiments.

FIGS. 1 and 2 show a cylindrical barrel 10 supported on a shaft 12 which is rotatably supported in the pillow block 14. The barrel and shaft may be driven by any convenient means. As shown, said means comprises an electric motor 15. The pillow block 14 is attached to a vertical support 16 which is in turn attached to the base 18 by bolts 20, 20. The motor 15 rests on a bracket 22 which is attached to the support 16 by the bolts 24, 24.

The barrel 10 is hollow and has an opening 26 at its forward end defined by a radial flange 28. The inside cylindrical surface of the barrel 10 is accurately machined to form a plurality of semi-circular peripheral grooves 30, 30.

A second support 32 is also bolted to the base 18 and is adapted to support an arm 34 on which a conveyor means is received as shown. In accordance with the present invention the conveyor means comprises a tray 36 for feeding balls to be lapped into the barrel grooves. As shown, the tray is also provided with grooves, and in assembling the tray and its supporting arm 34, these grooves are aligned with the annular barrel grooves 30, 30. Additionally, the tray 36 is tilted somewhat so that balls thereon tend to roll downward and toward the right as shown by the arrow 37 in FIG. 2. The clearance between a right-hand edge 38 of said tray and the inner cylindrical surface of the barrel 10 is such that the balls 40, 40 will roll over said edge 38 and be carried clockwise by the barrel in the direction of the arrow 41.

In operation the tray 36 is filled with balls to be lapped and a quantity of lapping fluid provided in the barrel 10.

As the motor 15 rotates the barrel, the balls 40, 40 nearest the lower right-hand edge 38 of the tray 36 will urged downwardly and to the left as indicated by the arrow 41. So too as the barrel is rotated, the lapping fluid is carried up and to the left to some point A where the force of gravity overcomes the combined centrifugal force of the moving lapping fluid and its tendency to adhere to the surface of the barrel and as a result it therefore pours backwardly on top of the fluid which is being drawn upwardly along the barrel surface to return to the lower portion of the barrel. In a similar manner the balls themselves will be drawn upwardly and to the left to some point B at which the force of gravity overcomes the centrifugal force of the ball causing it to fall backwardly as shown in FIG. 2. In accordance with the present invention, the left-hand edge 35 of the tray 36 is supported in closely spaced relationship with the grooved wall of the barrel at a point C just below point B to receive the balls as they fall from said latter point. The tray 36 is preferably grooved as best shown in FIG. 3 and aligned with the grooved barrel 10 so that the right-hand end of said grooves cooperate with the aforementioned barrel grooves 30, 30. The tray is inclined with respect to the horizontal in such a manner that the balls are caused to feed laterally across the upper surface of the tray to the right-hand edge 38 for another cycle in the ball lapping machine of the present invention. Although the tray 36 is shown as being flat, such is not essential to the present invention and said tray may comprise one or more flat surfaces or be curved throughout its length. As so arranged an arcuate segment of the rotating barrel below said tray is adapted to lap the balls carried therealong as the barrel rotates.

FIG. 4 shows a refinement upon the machine of FIG. 2. A plastic belt 42 or retainer is there shown suspended from beneath the tray 36 by a plurality of screws 44, 44. The retainer 42 conforms to the curvature of the barrel and is of such length that it touches the tops of the balls being lapped by the arcuate segment in order to induce rotation of these balls relative to the rotating barrel, the weight of the belt urging the same radially outwardly against the balls. The function of the retainer 42 is therefore to induce rolling of the balls in the grooves and prevent them from being carried by the barrel without rolling, a situation which would result in nonuniform lapping over the balls spherical surface. Additionally, the retainer 42 is preferably grooved in a semi-circular manner in order to cooperate with the grooves 30, 30 in the barrel 10 as shown in FIG. 4A, thereby improving the efficiency of the lapping process.

FIG. 5 shows an alternative means for inducing rolling between barrel and balls. In order to induce this rotation, a series of baffles 46, 46 extend generally perpendicularly downwardly with respect to the underside of the tray 36. These baffles are spaced from one another and are of such length as to allow the balls being lapped to be carried therebeneath but at the same time to inhibit the circulation of lapping fluid. The fluid is prevented from traveling upwardly with the balls and is trapped in the spaces between the baffles 46, 46 substantially as shown. Thus the baffles, like the belt 42 of FIG. 4, tend to improve the basic lapping process carried out in said arcuate segment by the machine of FIG. 2.

To summarize, the foregoing embodiments are all characterized by a cylinder which rotates in a force field such as that of gravity. The interaction between the centrifugal force due to rotation, and the gravity force due to positioning the cylinder with its axis generally perpendicular to the direction of the gravity field, combine to produce the desired motion of balls and lapping fluid in the machine illustrated. It will be apparent to one skilled in the art that other force fields might be utilized to achieve this motion in a machine for lapping steel balls. For instance, a magnetic field suggests itself in the light of the ferrous composition of the steel balls. Another possible embodiment would be to mount the cylinder 10 on the shaft 12 as shown heretofore and to mount the entire assembly at some radial distance from another axis of rotation so that a centrifugal force field would be to set up in the cylinder 10 as the entire assembly of FIG. 1 is rotated or orbited about the latter axis. FIGS. 8 and 9 represent such a machine and will be described in greater detail hereinafter.

Turning now to FIGS. 6 and 7, another embodiment of the present invention is there illustrated. An outer cylindrical barrel 10a is generally similar to that previously described having annular semi-circular grooves 30a, 30a in the inner cylindrical surface thereof. The barrel 10a may be similarly mounted and driven, a detailed description of which should not need repetition here. Unlike the embodiments described heretofore, however, the FIG. 6 device does not have a rectangular tray mounted within the barrel. In place of such a structure conveyor means are provided for inserting a plurality of balls to be lapped in the grooves 30a, 30a. As shown said means comprises a stationary curved track 50 on which balls may be inserted at point D. Said track also serves to carry the lapped balls from a second point E back to said first point D where they can be either removed after a predetermined number of cycles, or allowed to be refed into these grooves for further lapping. As so arranged the stationary arcuate segment of the rotating barrel will be seen to extend from point D to point E permitting a major part of the cylindrical lapping surface to act on the balls being carried therethrough. As presently constructed, at least that part of said track 50 which defines said point D is accessible from outside the barrel 10a in order to facilitate the insertion and removal of balls from the machine. Although not shown, it will be understood that the curved track 50 may be held in said stationary position by support means generally similar to that previously described with reference to the rectangular tray conveyor means of the aforementioned embodiments.

An inner retainer 52 is also provided in the FIG. 6 embodiment of my invention to induce rotation of the balls relative to the rotating barrel 10a in said segment. This retainer 52 is preferably constructed of a resilient material such as plastic or the like and is not unlike the plastic belt 42 of FIG. 4 in its construction and function. As shown in FIG. 6 the retainer 52 is attached to the inside of the track 50 and is therefore held stationary by the associated track supporting means as the barrel rotates in the direction of the arrows 41, 41.

In order to more accurately position the retainer 52 throughout its circumference biasing means are provided at spaced points therealong to urge said inner retainer generally radially outwardly with respect to the center of the rotating barrel 10a. As shown said biasing means comprise two leaf springs 53, 53 adjacent the ends of said retainer 52. These springs also serve to hold the retainer in relation to the track 50. The springs 53, 53 are provided with openings adapted to receive screws for attaching them to the retainer and the track. In addition some or all of these openings are preferably elongated to provide an adjustable positioning means for the retainer 52 in relation to the track 50 and the barrel 10a. A third spring 54 is shown intermediate the springs 53, 53 to maintain the generally cylindrical shape of the retainer. This third spring 54 is a coiled compression type seated on a shoe 55 to distribute the spring force over a substantial length of the inner surface of the retainer in the manner of the leaf springs 53, 53.

As mentioned heretofore with respect to the retaining belt 42 of FIG. 4 the outer surface of the retainer 52 is preferably provided with circumferentially extending grooves 56, 56 which cooperate with the grooves 30a, 30a in the barrel 10a. These grooves 56, 56 are preferably semi-circular in cross section in order to improve the overall efficiency of the lapping process in a machine of the FIG. 6 configuration.

It will be apparent that the FIG. 6 device requires a scoop 58, of some sort at E to remove the lapped balls from the rotating barrel 10. This portion of the machine may be similar to the scoop used to pick balls off the wringer plate of a conventional lapping machine and is therefore not shown in detail here. Once the balls are removed from the grooves 30a, 30a, the track 50 carries them away from the rotating barrel 10a where they can either be removed by hand, or automatically as by a conveyor system or the like. They may also be refed into the machine at D by said track 50 as described heretofore.

FIGS. 8 and 9 illustrate still another embodiment of the present invention having a series of rotating barrels or cylinders 10b, 10b each of which is located at the same radial distance R from a central axis of rotation 62. As so arranged, a centrifugal force field is created in these barrels 10b, 10b as the entire assembly is rotated about the axis 62.

More particularly, a large drum 60 is provided with supporting and driving means, not shown, to cause it to rotate about its central axis 62. The drum 60 is preferably open at a forward side and closed at its rearward side by a plate 61. A plurality of grooved cylinders 10b, 10b generally similar to the barrels 10a, 10a previously described are rotatively supported on said plate 61. Each of said cylinders has a shaft 12b which extends through the plate 61 with one end fixedly attached to said cylinder and its other end fitted with a gear 64 for rotating its associated cylinder with respect to the drum. As shown, a powered gear 66 is attached to the shaft which supports the drum 60, and said gear 66 engages the gears 64, 64 to supply rotative power to the associated grooved cylinders.

In accordance with the present invention, conveyor means are provided permitting a plurality of balls to be inserted in these grooves. As shown said means comprises a series of tray structures 36b, 36b attached to an annular rim 68 on the drum 60. As so arranged, the centrifugal force field created by said rotating drum influences movement of the balls and the lapping fluid in much the same manner as the gravity force field in the FIG. 1 device. One advantage to employing the centrifugal force field in lieu of gravity is in the greater forces achieved by the former. Thus, with but a small sacrifice to complexity, a very efficient ball lapping machine of the present invention is possible.

The invention claimed is:

1. An apparatus for lapping steel balls and comprising at least one hollow cylinder supported for rotation about its central axis and adapted to contain a quantity of lapping fluid therewithin, an inner cylindrical lapping surface defined by a series of spaced parallel circumferential grooves therein, said grooves being semicircular in cross section to accommodate a plurality of spherical balls, ball conveyor means arranged at least partly within said cylinder and adapted to feed balls to be lapped into said grooves, said conveyor means supported in fixed relationship to said cylinder axis and having one end positioned adjacent the inner cylindrical surface at a first point and a second end adjacent the said surface at a second point defining an arcuate segment of said cylindrical lapping surface therebetween, said cylinder axis oriented generally perpendicular to a directional force field which influences movement of said balls and of the lapping fluid said conveyor means including a tray inclined at a fixed angle with respect to said force field and extending from said first point to said second point on said inner cylindrical lapping surface, grooves in said tray for transporting lapped balls from said second end to said first end where they are adapted to being inserted in the grooves of said cylinder, the lapped balls being removed from said cylinder grooves at said second point by the influence of said force field thereupon.

2. The apparatus defined in claim 1 and including ball retaining means nonrotatively supported from the said ball conveyor means, said retaining means comprising an arcuate member adapted to contact the balls traversing said arcuate segment so as to induce rotation of the balls relative to the cylindrical lapping surface.

3. The apparatus defined in claim 1 and including baffle means operatively associated with said fluid for inducing rotation of the balls relative to the lapping surface whereby uniform lapping action over the entire surface of the balls is assured.

4. The apparatus defined in claim 1 further characterized by a series of baffles extending generally radially outwardly from said tray, outermost end portions of said baffles in closely spaced relationship to the balls being lapped whereby lapping fluid is caused to become trapped between said baffles as said cylinder rotates inducing rotation of the balls being lapped relative to the cylindrical lapping surface.

5. The apparatus defined in claim 1 wherein a plurality of said hollow cylinders are circumaxially spaced about a secondary axis at equal radial distances and in parallel relation therewith, and means for rotating all of said cylinders about their own axes and about said secondary axis, so that a centrifugal force field is created in each of said cylinders for influencing movement of said balls and said lapping fluid, each of said cylinders having a tray associated therewith, which tray is inclined with respect to the radial direction of said centrifugal force field as aforesaid.

6. The apparatus defined in claim 1 further characterized by retaining means inside the cylinder and supported from said tray so that at least a portion thereof is adapted to contact the elements being lapped along said arcuate segment so as to induce rotation of said elements relative to said lapping surface whereby a uniform lapping action is assured over the entire bearing surface of said elements.

7. The apparatus defined in claim 6 wherein said element contacting portion of said retaining means defines spaced parallel grooves to cooperatively associate with the grooves in said cylinder.

References Cited by the Examiner

UNITED STATES PATENTS

| 598,510 | 2/1898 | Hathorn | 51—164 |
| 1,491,601 | 4/1924 | Fuller | 51—164 |
| 1,660,811 | 2/1928 | Perkins | 51—73 |
| 1,973,922 | 9/1934 | Dumas | 51—289 X |

FOREIGN PATENTS 265,821  10/1913  Germany.

LESTER M. SWINGLE, *Primary Examiner.*